3,393,585
CONTROL SYSTEM FOR A MULTIPLE SPEED RATIO POWER TRANSMISSION MECHANISM AND SEMIAUTOMATIC AND AUTOMATIC RATIO CHANGING FEATURES
Stanley Leroy Pierce, Jr., Madison Heights, Mich., assignor to Ford Motor Company, Dearborn, Mich., a corporation of Delaware
Filed Jan. 5, 1966, Ser. No. 518,820
15 Claims. (Cl. 74—864)

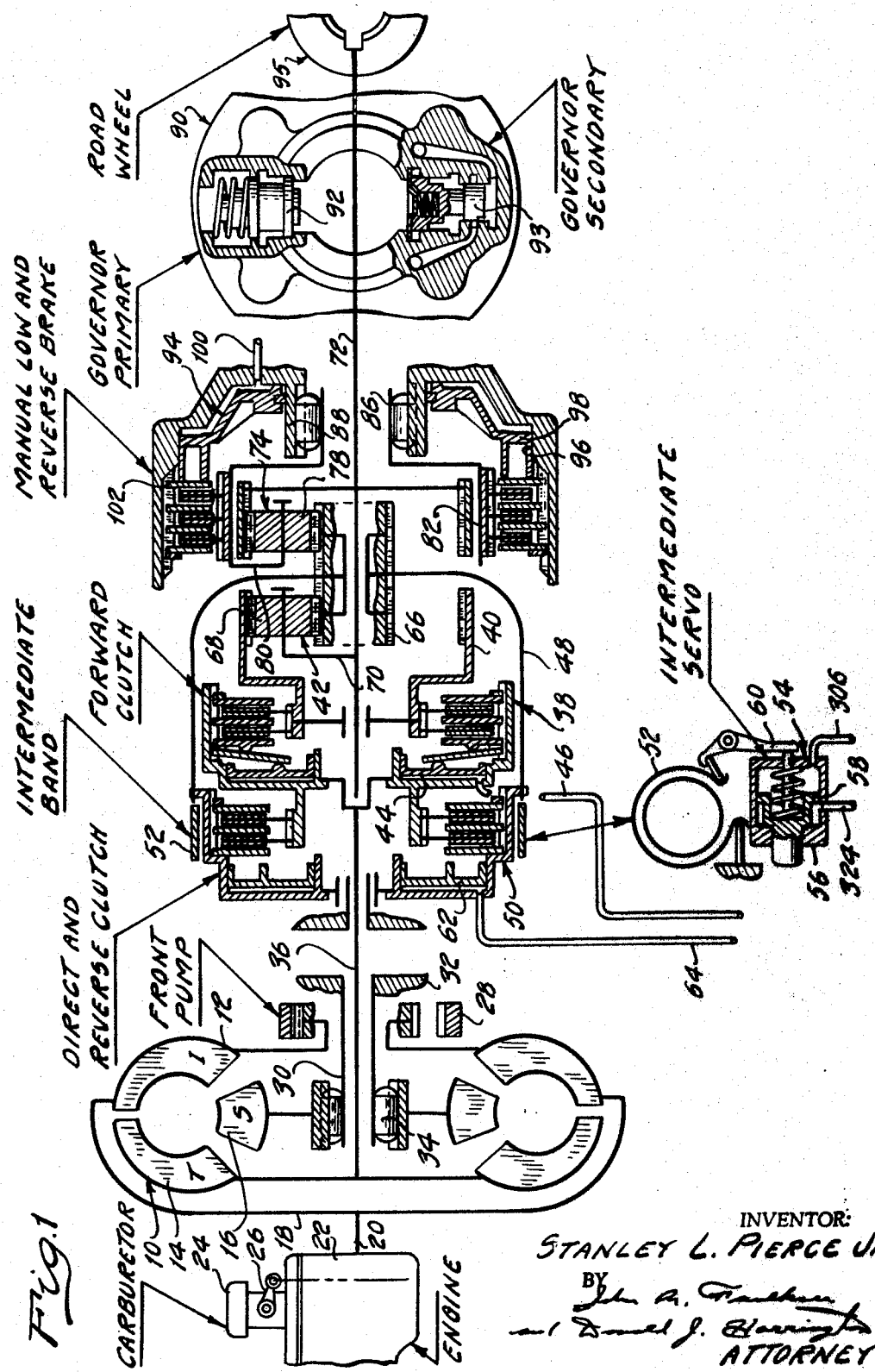

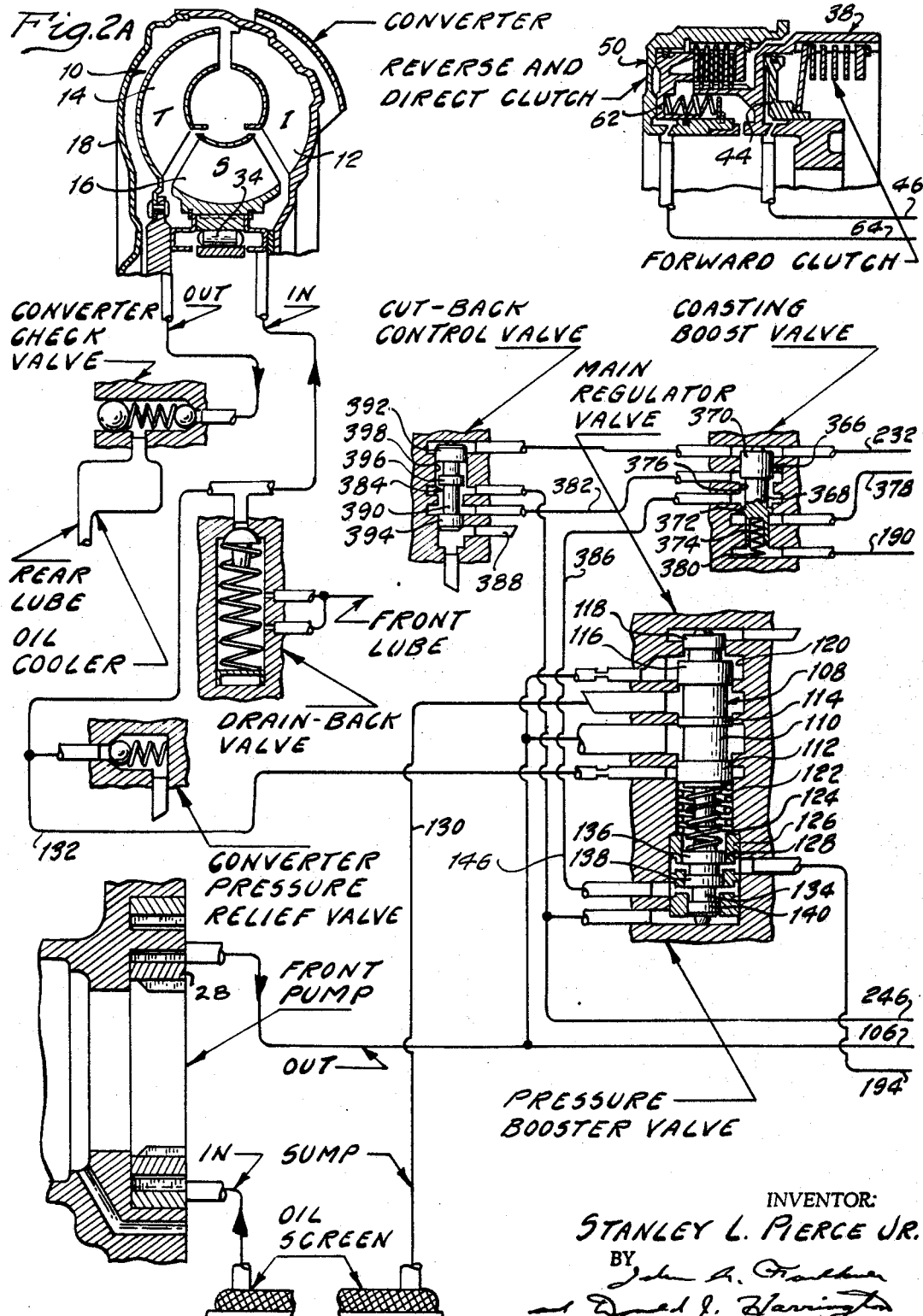

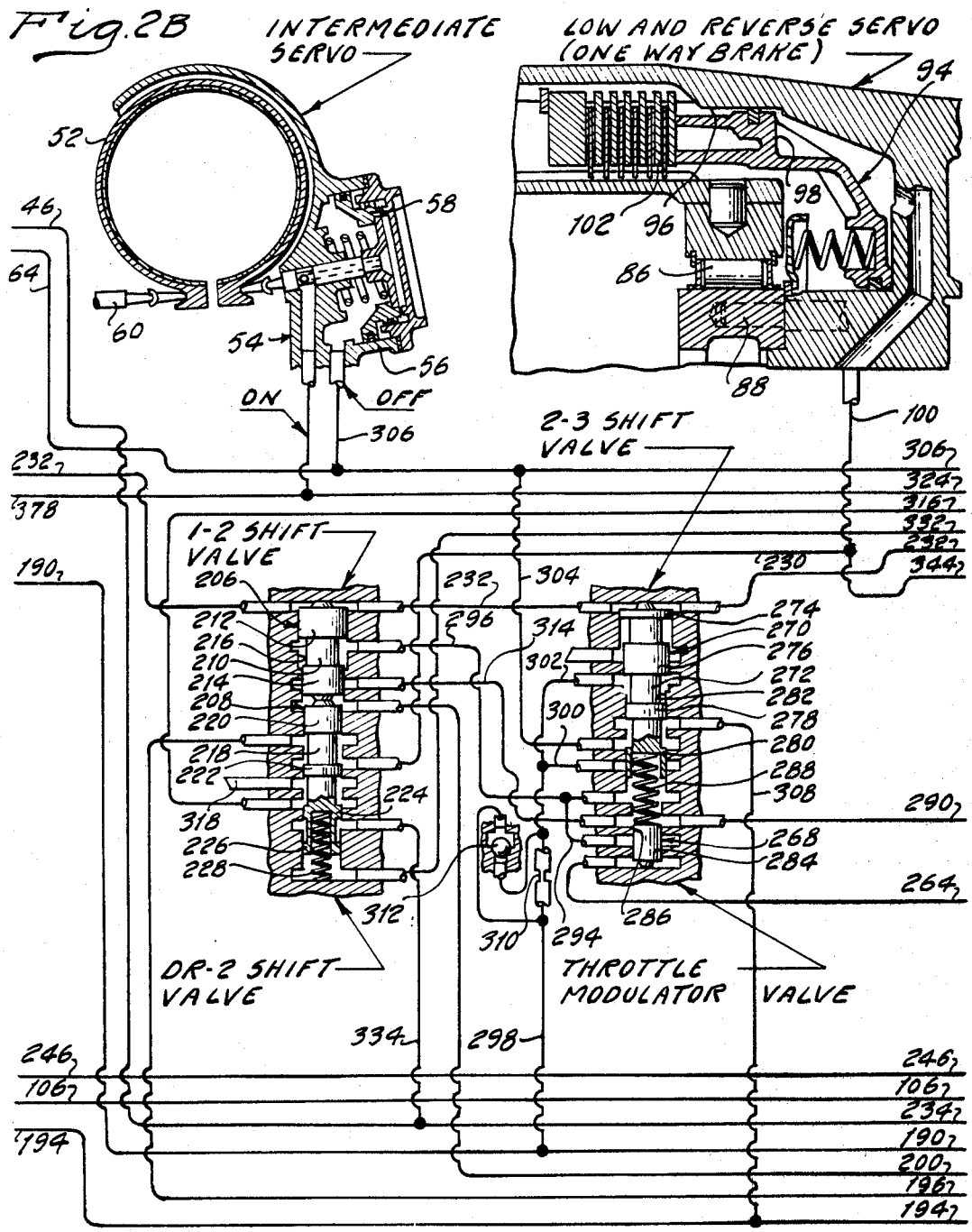

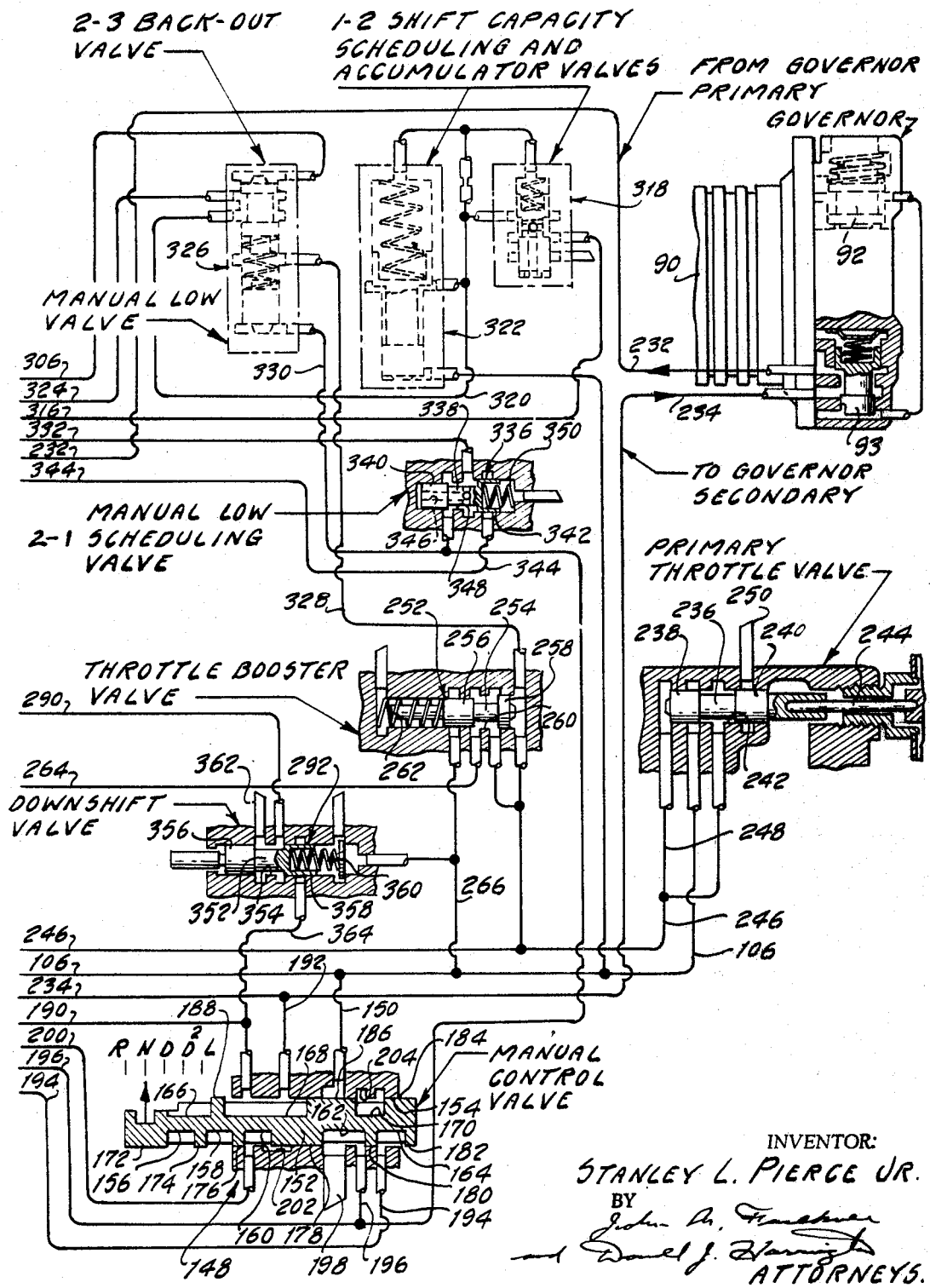

ABSTRACT OF THE DISCLOSURE

A planetary transmission controlled by fluid servo actuated clutches and brakes. The pressure distribution to the various servos is controlled in an automatic phase by a plurality of shift valves which, in turn, are controlled by output shaft speed and engine torque signals. A manual valve is utilized to overrule the automatic operation to allow the vehicle operator to impose upon the transmission system a shift pattern of his own choosing.

---

My invention relates generally to multiple speed ratio, geared, power transmission mechanisms for use in a driveline for an automotive vehicle. It relates more particularly to a control valve system for controlling the relative motion of the torque delivery elements of the transmission system whereby the speed ratios can be changed to satisfy any of a variety of vehicle performance conditions.

The transmission mechanism includes multiple clutches and brakes that are controlled by means of fluid pressure operated servos. It includes also a hydrokinetic torque converter having an impeller, a turbine and a stator arranged in toroidal fluid flow relationship with the impeller drivably connected to the vehicle engine. The turbine is connected drivably to a power input element of the torque transmitting gearing. The transmission mechanism includes also a positive displacement fluid pump that is drivably connected to an engine driven portion of the driveline.

The valve system of my invention includes fluid pressure conduits extending from the pump to the working chambers of the clutch and brake servos. Fluid pressure distributor valves are situated in the conduits for controlling pressure distribution to the various servos during shift sequences. The distributor valves respond to operating variables such as driven speed and engine torque. An appropriate engine torque signal source in the form of a primary throttle valve assembly is included in the system and is arranged in fluid communication with the distributor valves. A governor valve assembly in the system provides the necessary driven speed signal.

The effective pressure of the pump is regulated at a controlled operating level by means of a main regulator valve assembly. In a preferred form of my invention this regulator valve assembly responds to changes in the magnitude of the engine torque pressure signal to produce an effective circuit pressure that is sufficient to maintain the necessary torque transmitting capacity of the clutch and brake elements of the system regardless of the torque demands that are imposed upon it. The regulator valve assembly responds also to an auxiliary pressure force that produces an amplified circuit pressure when the torque ratio of the transmission system is increased. The amplified pressure is unavailable, however, when the vehicle speed approaches a value corresponding to an increased converter torque ratio thereby resulting in a restoration of the normal regulated circuit pressure.

In a preferred form of my invention, there are several drive ranges that are available. Each range can be chosen by the vehicle operator as desired. He does this by appropriately positioning a manual valve situated in the pressure delivery conduits of the valve system between the source of regulated pressure and the distributor valves.

When the operator selects a first drive range position of the manual control valve, the distributor valves are rendered fully effective thereby enabling the transmission system to shift automatically in response to changes in engine torque and vehicle speed to produce two automatic upshifts during the acceleration period. The highest speed ratio in the shift pattern may be a so-called direct drive, 1:1 ratio.

It is possible, when the manual control valve assumes the automatic drive range position, for the vehicle operator to effect a downship from the high speed ratio to an intermediate speed ratio by advancing the engine carburetor throttle. It is possible also to obtain a shift from the high speed driving ratio to the lowest speed ratio when the vehicle is coasting from a high speed to a speed approaching zero miles per hour. The provision of a valve system having these features in an object of my invention.

If the vehicle operator chooses to overrule the automatic shift sequence and impose upon the transmission system a shift pattern of his own choosing, he may adjust the manual control valve to either one of two other forward drive range positions. In a so-called second drive range position, the manual control valve distributes a signal pressure to the distributor valve that controls ratio shifts between the lowest speed ratio and the intermediate speed ratio to overrule its normal downshifting tendencies. In this way, continuous operation in the intermediate speed ratio can be obtained regardless of varying performance indicators such as engine torque and vehicle speed. Automatic upshifts from the intermediate speed ratio to the high speed ratio are prevented under these conditions since the manual control valve also functions to render the other distributor valve ineffective. That other distributor valve normally would control automatic ratio changes between the intermediate speed ratio and the high speed ratio. The provision of a valve system having these features is another object of my invention.

If the vehicle operator chooses to operate the transmission system in the low speed ratio continuously with no automatic ratio changes, he may adjust the manual control valve to a so-called low drive range position. At that time, all upshifts are prevented. If the vehicle is operating at a speed greater than a precalibrated speed, such as 35 to 45 miles per hour, and if the vehicle operator then shifts the manual control valve to the low drive range position, the transmission will initially assume an intermediate speed ratio condition. At that time the vehicle will coast until the speed falls below the calibrated speed. The distributor valve that controls ratio changes from intermediate speed ratio to the low speed ratio is effective at that time to initiate the shift. Upon doing so, however, it becomes locked in the low speed ratio position and it thereafter is incapable of effecting an upshift from the low speed ratio to a higher speed ratio regardless of subsequent changes in the vehicle speed or engine throttle setting. The provision of a valve system of this type is another object of my invention.

With a system of this type it is possible for the vehicle operator to take advantage of the fully automatic features of an automatic power transmission mechanism and at the same time enjoy the option of having a semi-automatic control. The two underdrive ratios that are available with this system are useful also to obtain the most desirable engine braking characteristics. Continuous operation in one of the lower speed ratios would be desirable, for example, during coasting of the vehicle down a long continuous grade. Thus my improved control system provides an added degree of flexibility without sacrificing the advantages normally associated with an automatic control system. The provision of such a system is another object of my invention.

For the purpose of describing my invention more particularly, reference will be made to the accompanying drawings, wherein:

FIGURE 1 shows in schematic form a planetary power transmission mechanism capable of being used with my improved automatic control system; and FIGURES 2A, 2B and 2C show in schematic form the valve elements of my improved automatic control system.

Referring first to FIGURE 1, numeral 10 designates a hydrokinetic torque converter unit which comprises an impeller 12, a turbine 14 and a stator 16. The converter members are bladed and they are situated in toroidal, fluid flow relationship in a common torus circuit. Stator 16 changes the tangential component of the absolute fluid flow velocity vector of the fluid that leaves the turbine thereby creating a hydrokinetic torque reaction. This reaction is distributed to a portion of the housing 32 through an overrunning coupling 34 and a stationary stator sleeve shaft 30. Coupling 34 inhibits rotation of the stator in a direction opposite to the direction of rotation of the turbine and the impeller, but freewheeling motion in the other direction is permitted when the converter acts as a fluid coupling.

The impeller 12 is connected by means of a drive shell 18 to the crankshaft 20 for an internal combustion vehicle engine 22. The engine includes an air-fuel mixture intake manifold that is supplied with a combustible mixture by a carburetor 24. An engine carburetor throttle valve, shown in part at 26, controls the flow of combustible mixture to the engine intake manifold.

A positive displacement fluid pump 28 is drivably connected to the impeller 18 and is effective to supply fluid pressure whenever the engine is operating. Pump 28 acts as a pressure source for the control system that will be described with reference to FIGURES 2A, 2B and 2C.

The turbine 14 is connected to a turbine shaft 36, which in turn may be connected to a ring gear 40 for a first simple planetary gear unit 42. A selectively engageable forward clutch 38 is provided for the purpose of establishing and interrupting the connection between shaft 36 and ring gear 40. Forward clutch 38 includes an internally splined clutch drum that defines an annular cylinder within which an annular piston 44 is situated. This annular piston and the annular cylinder cooperate to define a pressure cavity that is supplied with actuating fluid pressure by means of a feed passage 46. A drive shell 48 is connected to a clutch drum for a direct and reverse clutch 50.

A brake band 52 surrounding the drum may be applied and released selectively by means of an intermediate servo shown in FIGURE 1 at 54. The servo includes a cylinder that receives a piston 58. The cylinder and the piston cooperate to define a pair of opposed fluid pressure chambers that may be supplied with actuating fluid by means of separate pressure feed passages as will be seen in the subsequent description. The pressure force acting upon piston 58 is transferred of the operating end of brake brake band 52 by means of a motion transmitting brake lever 60. The other end of the brake band 52 is anchored in a conventional fashion.

The drum for the direct and reverse clutch 50 defines an annular cylinder within which is received an annular piston 62. This piston and its cooperating cylinder define a working chamber that is supplied with fluid by means of a pressure feed passage 64.

A simple planetary gear unit 42 includes also a sun gear 66 which meshes with a set of planet pinions 68. These pinions are rotatably carried by a carrier 70, which is connected directly to a power output shaft 72.

Sun gear 66 forms also a part of a second simple planetary gear unit 74. This gear unit includes also a ring gear 76 and a set of planet pinions 78, the latter being journaled rotatably on a carrier 80. Carrier 80 defines a brake drum 82 which in turn carries brake discs of a manual low and reverse brake 84. The driving torque reaction on the carrier is accommodated by means of an overrunning coupling having brake rollers 86. These rollers are disposed between an inner race, that is common to the carrier 80, and an outer race 88, the latter being cammed to provide cam surfaces that cooperate with the rollers 86 to inhibit rotation of the carrier 80 in one direction, although freewheeling motion of the carrier 80 in the opposite direction is permitted. Race 88 is secured fast to the transmission housing.

A fluid pressure governor valve assembly 90 is drivably carried by power output shaft 72. It includes a primary governor valve 92 and a secondary governor valve 93, each valve being situated on opposed sides of the axis of rotation of the shaft 72. As will be explained subsequently, the primary governor valve inhibits the modulating action of the secondary governor valve at speeds of rotation of the shaft 72 that are less than a predetermined value. At any speed greater than that predetermined value, the secondary governor valve is effective to establish a pressure signal that is proportional in magnitude to the speed of rotation of the shaft 72. The signal may be utilized by the automatic control valve system that will be described subsequently.

Shaft 72 can be connected to the vehicle road wheels 95 through a driveshaft and differential and axle assembly.

The discs of brake 84 are applied and released by means of a fluid pressure operated servo 94. The servo includes a cylinder 96 within which is positioned a fluid pressure operated piston 98. Cylinder 96 and piston 98 define a pressure chamber that can be supplied with control pressure through a feed passage 100. The fluid pressure force acting upon the piston 98 is transferred to the operating end of the brake band 84 by means of a disc brake pressure ring shown at 100. The cylinder 96 is defined by the relatively stationary transmission housing.

The transmission mechanism may be conditioned for continuous operation in the lowest speed ratio by appropriately adjusting a manual valve to the low speed ratio position as will be explained subsequently. This causes fluid pressure to be distributed to the pressure chamber for the reverse and low servo. The forward clutch 38 is applied during operation in the forward drive range in any speed ratio. If both the brake 84 and the clutch 38 are applied, the turbine torque delivered to the turbine shaft 36 is distributed through the engaged forward clutch 38 to ring gear 40. The driven shaft 72 to which the carriers 70 and 80 are connected tends to resist rotation. Thus, there is a tendency for sun gear 66 to rotate in a direction opposite to the direction of rotation of shaft 36. This, then, tends to cause carrier 80 to rotate in the same direction as the direction of rotation of sun gear 66. It is inhibited from doing so, however, both by the overrunning brake shown in part at 86 and also by the engaged brake 84. The torque acting on the ring gear 76 then is in a forward driving direction. It supplements the driving torque of the carrier 70 so that a split torque delivery path is provided between the shaft 36 and the shaft 72.

Drive shell 48 which is connected directly to the sun gear 66 can be braked by applying the intermediate servo, thus establishing intermediate speed ratio operation. Under these conditions, the brake 84 is released while the clutch 38 remains applied. Clutch 50, of course, is released. The sun gear 66 functions as a reaction member during such intermediate speed ratio operation, and the driving torque delivered to the ring gear 40 is multiplied by the first planetary gear unit 42. The overall speed ratio then is greater than the lowest speed ratio, but it is less than unity. The overrunning coupling shown in part at 86 freewheels during this speed ratio change from the lowest speed ratio to the intermediate speed ratio.

To condition the mechanism for operation in the lowest speed ratio during normal acceleration from a standing start, it is not necessary to apply brake 84. The overrunning brake shown in part at 86 accommodates the forward acting torque. Upon application of the intermediate speed ratio brake band 52, an automatic pickup shift from the lowest speed ratio to the highest speed ratio is obtained. This is accomplished by the engagement of a single friction torque establishing device without the necessity for engaging or releasing a second friction torque establishing device in the system.

A speed ratio change from the intermediate speed ratio to the direct drive, high speed ratio is accomplished by releasing brake band 52 and applying both clutches 38 and 50 simultaneously. Brake band 52 is released by distributing pressure to the right-hand side of the piston 58. The brake band 52 is released when both pressure chambers of the intermediate servo are pressurized.

It will be seen, therefore, that the elements of the gear units will be caused to rotate in unison when both clutches are applied. A direct drive connection between shafts 36 and 72 then is provided.

Automatic speed ratio changes can be accomplished in order to condition the driveline for various road conditions and for various operating demands. This is done by means of the control valve system that now will be described.

The instant disclosure contains several valve elements that are common to my copending application Ser. No. 426,928 filed Jan. 21, 1965, now Patent No. 3,309,939, which is assigned to the assignee of my instant invention. Reference may be had to that copending application for purposes of supplementing this disclosure.

In FIGURE 2A, the engine driven front pump 28 receives its supply of oil through a supply passage 102, which communicates with the transmission sump that may be defined by the lower region of the transmission housing. An oil screen 104 is located in the sump at the intake end of the passage 102.

The high pressure side of the pump 28 communicates with the main line pressure passage 106. A main regulator valve 108 maintains a controlled pressure level in the passage 106. It includes a movable valve element 110 having spaced valve lands 112, 114, 116 and 118. These lands are adapted to register with internal valve lands formed in a valve bore 120 which receives the valve element 110. The portion of the chamber 120 at the upper end of the land 118 is exhausted. Line pressure from passage 106 is distributed to the differential area defined by lands 118 and 116, thereby creating a pressure force that is opposed by the force of valve springs 122 and 124. Spring 122 is seated on the valve sleeve insert 126, which forms a part of a pressure booster valve 128. The ragion of the chamber 120 that is occupied by the springs 122 and 124 is exhausted as indicated.

When pressure in passage 106 begins to be developed as the pump 28 becomes operative, valve element 110 is urged in a downward direction to provide controlled communication between passage 106 and a low pressure oil return passage 130. Before land 114 uncovers the passage 130, however, land 112 uncovers converter fluid supply passage 132. Thus, the converter is filled during the initial stages of the pressure build-up in the control system. Once the land 114 establishes communication between passage 106 and passage 130, however, the element 110 begins to regulate the pressure in passage 106.

The pressure booster valve comprises a valve element 134 which has spaced valve lands 136, 138 and 140, each land being formed with a progressively decreasing diameter. The differential area defined by lands 136 and 138 communicates with a passage 194 which is pressurized, as will be explained subsequently, whenever the transmission mechanism is conditioned for reverse drive operation. The resulting pressure force acting on the element 134 thus augments the force of the valve springs for the main regulator valve to cause the main regulator valve to maintain a higher pressure level in the circuit than the corresponding pressure level that would exist during forward drive operation. The servos which must accommodate the increased driving torque under reverse driving conditions thus can be maintained at the proper pressure level to avoid slippage of the clutch and brake friction elements.

The lower area of land 140 is in communication with passage 246, which is subjected to an engine torque sensitive signal pressure during normal operation. The resulting pressure force acting upon the pressure booster valve supplements the spring force after the magnitude of the signal pressure reaches a predetermined value. After that value is reached, the regulated line pressure maintained by the main regulator valve will be dependent upon engine torque. For any magnitude of the signal pressure less than that predetermined value, the pressure force acting upon the pressure booster valve will be insufficient to overcome the force of spring 124. The spring 124 yields, however, when the magnitude of the signal pressure in passage 246 exceeds the predetermined value.

A cut-back pressure passage 146 communicates with the differential area of lands 138 and 140. Passage 146 communicates through a coasting boost valve with a so-called cut-back valve, which will be described subsequently, and it in turn communicates with the engine torque signal pressure source. The cut-back valve is road-speed sensitive. At any road-speed less than a predetermined value, the cut-back valve causes passage 146 to become pressurized with the torque sensitive signal pressure.

Thus during acceleration from a standing start when the hydrokinetic torque ratio of the converter is at a maximum value, the available line pressure for any given engine throttle setting will be at a maximum value.

The regulated line pressure in passage 106 is distributed to the manual valve 148 through branch passage 150. Manual valve 148 includes a shiftable valve element 152 which is situated slidably within a valve chamber 154. Element 152 includes a series of recesses 156, 158, 160, 162 and 164. These recesses are situated on one side of the valve element 152. In the drawings, this side is located below the center line of the valve element.

Element 152 includes also three other recesses situated on the opposite side thereof. These are identified by reference characters 166, 168 and 170. Element 152 and the recesses formed therein define a plurality of external valve lands which are identified by the reference numerals 172, 174, 176, 178, 180, 182, 184, 186 and 188. The valve chamber 154 is formed with a plurality of internal valve lands that register with the external valve lands of valve element 152.

Valve element 152 can be adjusted to any one of several operating positions. These positions are identified by the symbols R, N, D, D2 and L. The symbols correspond respectively to the reverse drive position, neutral position, automatic forward drive position, the intermediate speed ratio drive position and the low speed ratio drive position. In the drawings, valve element 152 is situated in the neutral position.

Valve element 152 can be actuated by means of a suitable drive controlled linkage not shown. Passage 150 communicates with valve chamber 154 at a location adjacent land 186. This land blocks passage 150 when the element 152 assumes the neutral position shown.

Passage 190, when the element 152 assumes the position shown, communicates with the valve chamber 154 at a location adjacent lands 188 and 186. A passage 192 communicates with the valve chamber 154 at a location intermediate the passages 150 and 190. The passage 194 communicates with chamber 154 at a location adjacent land 180 and between land 180 and land 182. Another passage 196 communicates with chamber 154 at a location adjacent land 180 and between land 180 and land 178.

When the valve element 152 assumes the position shown, passage 196 communicates with an exhaust port 198.

A passage 200 communicates with the valve chamber 154 at a location adjacent land 176 and between land 176 and land 178. An annular valve port 202 is formed in the chamber 154 thereby establishing communication between either passage 190 or 192 and whichever recess 156, 158, or 160 is in communication with port 202.

Passage 190 and the communicating passage are exhausted through the left-hand end of the valve chamber 154. Passage 194 is exhausted through the right-hand end of the chamber 154 and passage 196 is in communication with exhaust port 198.

Drive range position D becomes exhausted through recess 158 and through the left-hand end of the valve chamber 154. Passage 196 continues to be exhausted through chamber 162 and exhaust port 198. Passage 194 also is exhausted through recess 162 and exhaust port 198. Passage 150 is brought into fluid communication with passage 190 and with passage 192.

If the manual valve element 152 is shifted to the intermediate speed ratio, drive range position D2, passage 150 becomes connected to passage 200 through recess 168, annular groove 202 and recess 158. Passage 190 becomes exhausted through recess 166 and the left-hand end of the valve chamber 154. Passages 194 and 196 become exhausted through recess 162 and the right-hand end of the valve chamber 154. Passages 192 and 150 continue to communicate through recess 168.

When the valve element 152 is shifted to the low speed ratio, forward drive position L, passage 150 is brought into fluid communication with passage 196 through recess 168 and an annular groove 204 formed in the valve chamber 154. Passage 194 is exhausted through the right-hand end of the valve chamber 154. Passage 190 is exhausted through the left-hand end of the valve chamber 154. Passage 200 also communicates with the exhaust region through recess 156 and the left-hand end of the valve chamber 154.

If the manual valve element 152 is shifted to the reverse drive position R, passage 200 is exhausted through recess 160 and the left-hand end of the valve chamber. Passages 192 and 190 each become exhausted through passage 168 and the left-hand end of the valve chamber. Passage 150 becomes connected through recess 170, annular groove 204 and recess 164 with each of the passages 194 and 196.

In summary, passage 196 is pressurized only during reverse drive operation and during operation in the low speed ratio, forward drive range. Passage 194 becomes pressurized only during reverse drive operation. Passage 192 becomes pressurized only when valve element 152 assumes the D position, the D2 position, and the L position. Passage 190 becomes pressurized only when the valve element 152 assumes the D position. Finally, passage 200 becomes pressurized only when valve element 152 assumes the D2 position.

Passage 192 communicates through passage 234 directly with the feed passage 46 for the forward clutch. Thus the forward clutch is applied whenever the manual valve assumes the D position, the D2 position or the L position.

Speed ratio changes between low speed ratio and the intermediate speed ratio are controlled by the 1–2 shift valve 206 and the D2 shift valve 208.

Valve 206 includes a valve spool 210 having a pair of spaced valve lands 212 and 214. Valve element 210 is situated slidably within a valve chamber 216 which has formed therein internal valve lands that register with the external valve lands 212 and 214.

Valve element 210 engages the DR–2 shift valve element 218 which has formed thereon spaced valve lands 220, 222, 224 and 226. A valve spring 228 urges the valve elements 210 and 218 in an upward direction as viewed in FIGURE 2B.

Passage 196, which is pressurized when the manual valve element 152 assumes the L or R positions, communicates with the valve chamber 216 at a location intermediate lands 220 and 222 on the valve element 218. The valve element 218 and the valve element 210 share the same valve chamber 216, the latter being formed with internal valve lands that cooperate with the external valve lands 220, 222, 224 and 226 on the valve element 218.

When the DR–2 shift valve assumes the position shown, communication is established between passage 196 and a passage 230. This passage communicates with feed passage 100 for the low and reverse brake servo. Governor pressure acts upon the upper end of land 212. It is distributed to chamber 216 through a governor pressure passage 232 which communicates with a suitable governor pressure signal source identified generally by reference character 90. This comprises primary and secondary valve elements 92 and 93 which are connected drivably to power output shaft 72. The valve assembly 90 receives regulated control pressure through passage 234 which is connected directly to passage 192. The governor valve assembly 90 modulates the pressure in passage 234 to produce a pressure signal in passage 232 which is related functionally in magnitude to the driven speed of shaft 72.

The control system includes also a source of a pressure signal that is proportional in magnitude to engine torque. This is obtained by means of a primary throttle valve assembly having a valve spool 236 with spaced valve lands 238 and 240. Valve element 236 is slidably situated within the valve chamber 242 having internal valve lands that register with the valve lands 238 and 240. Valve element 236 normally is urged in a left-hand direction, as viewed in FIGURE 2C, by means of an engine intake manifold pressure operated diaphragm assembly that is in communication with the engine manifold. This assembly exerts a force upon the element 236 by means of a valve actuating rod 244. Control pressure from passage 106 communicates with the chamber 242 at a location directly adjacent land 238. A primary throttle valve output pressure passage 246 communicates with the valve chamber 242 intermediate the lands 238 and 240. A feedback pressure passage 248 extends from the passage 246 to the left-hand end of the chamber 242 thereby creating a throttle pressure force on land 238 that opposes the force of the engine manifold diaphragm assembly.

An exhaust port 250 permits the primary throttle valve assembly to modulate the pressure in passage 106 to produce a resultant pressure in passage 248 that is an indicator of the engine manifold pressure. This in turn is an approximate indicator of engine torque.

Passage 246 communicates with the pressure booster valve and distributes primary throttle pressure to the lower end of land 140 thereby causing the main pressure regulator valve to maintain a pressure level in the system that is proportional to manifold pressure. Passage 246 communicates also with a throttle booster valve 252. This valve includes a valve element 254 having valve lands 256 and 258 slidably situated within a valve chamber 260. A valve spring 262 acts upon element 254 to urge it normally in a right-hand direction as viewed in the drawings.

Throttle pressure in passage 246 acts upon the right-hand end of land 258. The diameter of land 258 is slightly larger than the diameter of land 256. Thus, the pressure force acting on the right-hand side of land 258 is opposed by the force of the pressure in passage 264, the latter communicating with valve chamber 260 at a location adjacent land 256. Regulated line pressure from passage 106 is distributed through passage 266 to the valve chamber 260. Valve element 254 modulates the pressure in passage 266 to produce a pressure in passage 264 that is magnified relative to the pressure in passage 246.

When the engine carburetor throttle setting is relatively slight, the magnitude of the pressure in passage 264 is insufficient to cause valve element 254 to modulate. Under these conditions the pressure in passage 264 equals the pressure in passage 246. The pressure in passage 264 is used to establish the shift points as will be explained subsequently.

When the engine carburetor throttle setting increases beyond a so-called midpoint, the ranges of the pressure in passage 246 no longer is proportional to carburetor throttle opening or engine torque demand. This is because the engine manifold pressure varies only very slightly for any given degree of opening of the engine throttle when the midpoint throttle setting is reached. Thus, in order to produce a useful signal it becomes necessary to augment the signal pressure in passage 246. This is the function of the throttle booster valve since it modulates the regulated control pressure in passage 266 in accordance with variations in the signal pressure of passage 246 to produce a magnified pressure signal in passage 264 which can be used as an indicator of engine torque demand. The throttle booster valve is sensitive to the pressure in passage 246 since the latter is directed to the right-hand end of the valve land 258 thus producing a force which opposes the force of spring 262.

Passage 264 communicates with the throttle modulator valve 268 which applies a modulated throttle pressure signal to a 2–3 shift valve 270. Valve 270 includes a multiple land valve spool 272 on which are formed external valve lands 274, 276, 278 and 280. These valve lands register with internal valve lands formed on a valve chamber 282 within which the valve element 272 is situated.

The throttle modulator valve includes a single diameter valve element 284 which is slidably situated within a valve chamber 286, the latter communicating with chamber 282 and forming an extension thereof. A valve spring 288 is positioned between valve element 284 and valve element 272. Booster throttle pressure in passage 264 is distributed to the lower end of chamber 286 thereby exerting on valve element 284 a pressure force that opposes the force of spring 288. A passage 290, which normally is exhausted through the downshift valve shown at 292, communicates with chamber 286 adjacent the upper edge of valve element 284. A branch passage 294 extends from the chamber 286 to the lower end of chamber 282. Valve element 284 controls communication between passage 294 and passage 264. Passage 294 communicates also with passage 296, which extends to the annular area defined by the differential diameter valve lands 214 and 212.

Passage 190 which is pressurized when the manual valve assumes the D position, communicates with a passage 298 which extends to a port 300 and to a port 302 formed in the valve chamber 282. Port 300 registers with valve land 280 and port 302 is located adjacent land 276. A reverse and direct clutch feed passage 304 communicates with valve chamber 282 at a location intermediate lands 278 and 280. Passage 304 communicates with the previously described passage 64. A passage 306, which communicates with the release side of the intermediate servo, communicates with passage 304. Thus, a release of the intermediate speed ratio brake and the application of the direct and reverse clutch occurs simultaneously in response to movement of the 2–3 shift valve 270. When the 2–3 shift valve element 272 assumes the position shown, passage 304 is exhausted through passage 308 which communicates with the valve chamber 282 adjacent land 278. Passage 308 in turn communicates with passage 194 which is pressurized, as mentioned previously, when the manual valve element assumes a reverse drive position. It is exhausted under all other conditions.

A flow restricting orifice 310 is situated in passage 298 to retard the rate of pressurized fluid distribution to the 2–3 shift valve. A one-way check valve 312 situated in parallel relationship with respect to the fluid flow restriction 310 permits relatively unrestricted pressurized fluid distribution from passage 304 to passage 298. The rate of application of the reverse and direct clutch and the rate of release of the intermediate servo thus can be controlled during upshift. Such a delay is undesired, however, during a 3–2 downshift, and for this reason the check valve 312 is provided for bypassing the restriction 310.

The throttle modulator valve element 284 produces a modulated pressure in passage 294 and in passage 296. Thus both the 1–2 shift valve and the 2–3 shift valve are sensitive to changes in the engine manifold pressure. Passage 290, which is exhausted during forward drive operation, communicates also with a passage 314 across the valve chamber 286. When the 1–2 shift valve assembly moves in a downward direction, the annular area defined by the differential diameter valve lands 212 and 214 becomes exhausted through passage 314. Prior to that time, this same annular area is pressurized with modulated throttle pressure thus producing a force that supplements the force of spring 228.

Passage 316 receives clutch applying pressure from a 1–2 shift capacity scheduling valve 318. When the shift valve 218 is in the position shown, communication is established between passage 196 and passage 230 which in turn communicates with the low and reverse servo through passage 100. When the 1–2 shift valve element 210 and the DR–2 shift valve element 218 are in a downward position, land 220 blocks communication between passage 296 and valve chamber 216 while passage 230 becomes exhausted through an exhaust port 318.

The 1–2 shift capacity scheduling valve 318 is described in my copending application Serial No. 426,928. It is supplied with fluid pressure through a passage 320 which communicates also with an accumulator valve 322. This valve modifies the rate of application of the intermediate speed ratio brake band during a 1–2 upshift. Valve 322 is described in my copending application.

Passage 320 in turn is supplied with fluid by means of a pressure passage 324 which communicates directly with the apply side of the intermediate servo. Communication between passages 320 and 324 is provided by a 2–3 back-out valve 326, which also is described in my copending application. This back-out valve is subjected to primary throttle pressure which is distributed thereto through a primary throttle valve pressure passage 328. The 2–3 back-out valve includes also a manual-low valve which may be pressurized by means of a passage 330 communicating with the passage 196, the latter being pressurized when the manual valve is shifted to the L or R positions. The manual valve, when it is pressurized, renders the 2–3 back-out valve inoperative thereby maintaining continuous communication between passages 324 and 320. The same result occurs if throttle pressure exists in passage 328. In the absence of pressure on the manual-low valve, and when the passage 328 is subjected to the minimum throttle pressure that exists during coasting, the 2–3 back-out valve will respond to cushion the rate of application of the forward clutch thereby eliminating an undesirable harshness in the speed ratio change from the intermediate speed ratio to the high speed ratio under zero throttle conditions.

Passage 200 which is pressurized whenever the manual valve is shifted to the D2 position, communicates with the valve chamber 216 of the 1–2 shift valve assembly at a location intermediate land 214 and land 220. Thus, when passage 200 becomes pressurized, valve element 210 is moved in an upward direction and valve element 218 is moved in a downward direction. Passage 192, which is pressurized when the manual valve is in the D2 position, continues to supply operating pressure to the forward clutch. Thus the transmission system, upon movement of the manual valve to the D2 position, will assume an intermediate speed ratio condition. It then is conditioned for continuous operation in the intermediate speed ratio. Neither upshifts nor downshifts are possible. Although the 2–3 shift valve assembly may move under the influence of modulated throttle pressure and governor pressure, this has no affect on the existing transmission speed ratio since passage 190 is exhausted. That passage normally feeds the 2–3 shift valve assembly.

If the operator desires to condition the transmission for continuous operation in the low speed ratio, he may shift the manual valve to the L position. This causes passages 192 and 196 to become pressurized. Pressurized passage 196 distributes operating pressure to passage 230, which in turn communicates with passage 100 which extends to the low and reverse servo. The forward clutch continues to be applied.

If the vehicle is traveling at a speed in excess of approximately 35 to 45 miles per hour, and if the manual valve is shifted to the L position, the reverse and direct clutch becomes exhausted through passage 298 and the left-hand end of the manual valve. The governor pressure, however, is conditioned to maintain the 1–2 shift valve in the upshift position. Thus, as the reverse and direct clutch becomes disengaged, the transmission system will assume an intermediate speed ratio condition until the vehicle speed falls below the critical vehicle speed of 35 to 45 miles per hour. The 2–1 downshift point is determined by the magnitude of a shift point pressure in passage 332 which communicates with the lower end of the DR–2 shift valve element 218.

Lands 224 and 226 are formed with a slight differential area that is in fluid communication through branch passage 334 with pressurized passage 192. This produces a slight downshifting force on the 1–2 shift valve assembly. The shift point pressure in passage 332 is supplied by a manual-low 2–1 scheduling valve 336. This valve includes a valve element 338 with spaced valve lands 340 and 342. Valve land 340 is slightly smaller than valve land 342. Passage 344, which communicates directly with the low and reverse servo, functions as an exhaust passage. This passage is exhausted through exhaust port 318 in the DR–2 shift valve chamber under these conditions.

Valve element 338 is formed with an internal passage 346 which establishes communication between passage 332 and the left-hand side of valve land 340. Valve element 338 is slidably situated in a valve chamber 348, the right-hand end of this chamber is exahusted and the left-hand end cooperates with the land 340 to define a feedback pressure chamber. A valve spring 350 normally urges the valve element 338 in a left-hand direction as viewed in the drawings.

The valve 336 may be calibrated so that the desired 2–1 shift point during coasting can be established after the manual valve is moved to the L position. When the governor pressure falls to a value that will permit the DR–2 shift valve and the 1–2 shift valve to shift in an upward direction, passage 196 becomes connected to passage 230 as the connection between passage 230 and the exhaust port 318 is interrupted. This causes passage 344 to become pressurized with the same pressure to which the low and reverse servo is subjected. This then causes the valve element 338 of the 2–1 scheduling valve 336 to shift in a right-hand direction since the diameter of land 342 is greater than the diameter of land 340. When this occurs, direct communication is established between passage 344 and passage 332. This then causes full line pressure to be exerted on the DR–2 shift valve thereby locking the DR–2 shift valve and the 1–2 shift valve in an upward position. Speed ratio changes, thereafter, are inhibited.

When the manual valve is shifted to the D position, passage 190 becomes pressurized as well as passage 192. Passages 200, 150, 194 and 196 become exhausted. Passage 190 distributes regulated control pressure to passage 298, which supplies the 2–3 shift valve as explained previously. Thus automatic ratio changes between the intermediate speed ratio and the high speed ratio can be accomplished as the vehicle speed changes for any given engine manifold pressure.

Passage 192 distributes control pressure to the forward clutch. Under these conditions, the overrunning brake shown in part at 86 provides the necessary torque reaction during low speed ratio operation. It is only necessary during low speed ratio operation to apply the forward clutch.

As the vehicle accelerates during operation in the D drive range, the 1–2 shift valve and the DR–2 shift valve will shift in a downward direction thereby connecting passage 334 with passage 316. The 1–2 shift capacity scheduling valve provides a fluid connection between passage 316 and passage 320. The 2–3 backout valve 326 provides a fluid connection between passage 320 and passage 324. Thus, when the DR–2 shift valve is shifted in a downward direction, the apply side of the intermediate servo becomes pressurized. Since, the forward clutch and the intermediate servo then are applied simultaneously, the transmission system assumes an intermediate speed ratio condition.

Upon a further increase in the vehicle speed for any given engine throttle setting, the 2–3 shift valve will respond to connect passage 304 with pressurized passage 298. This will cause the reverse and direct clutch to become applied as the release side of the intermediate servo becomes pressurized.

The shift valves can be forced to their downshift positions by the influence of the downshift valve 292. This valve includes a valve spool 352 which is slidably positioned in a valve chamber 354. Spool 352 is formed with spaced valve lands 356 and 358 which register with internal valve lands formed in the valve chamber 354. A valve spring 360 urges the valve element 352 in a left-hand direction. When it is in the position shown, passage 290, which communicates with the chamber 354, is exhausted through an exhaust port 362. At this time, passage 364, which communicates directly with passage 190, is blocked by land 358.

The vehicle operator may shift the valve element 352 in a right-hand direction by means of a suitable mechanical linkage that is connected to the engine carburetor throttle. The valve is actuated when the carburetor throttle is advanced to a wide open setting. When the engine carburetor throttle setting is less than the wide open setting, the linkage does not alter the position of the valve element 352.

To effect a full throttle downshift, the operator shifts the valve element 352 in a right-hand direction thereby blocking exhaust port 362 and establishing a connection between passages 364 and 290. This introduces control pressure to the lower valve land of the 2–3 shift valve and the area defined by differential diameter valve lands 212 and 214 of the 1–2 shift valve. The 2–3 shift valve immediately will assume a downshift position. If the vehicle speed is less than a predetermined value, the 1–2 shift valve also will assume a downshift position. If the vehicle speed is greater than that predetermined value, however, the 1–2 shift valve will not be moved and the transmission system will assume an intermediate speed ratio condition until the vehicle speed is reduced to a sufficiently low value to permit a 2–1 downshift.

When a downshift from the intermediate speed ratio to the low speed ratio occurs after moving the manual valve to the L position, the shift point is independent of carburetor throttle setting and engine intake manifold pressure. In this respect, the 2–1 downshift point differs from the corresponding 2–1 downshift point that is obtained by using the downshift valve 292.

During coasting operation, the line pressure assumes a higher value than during forward drive operation with a zero throttle setting. This boost in line pressure is obtained by means of a coasting boost valve 366.

This valve includes a valve spool 368 having spaced valve lands 370, 372 and 374. It is situated slidably within the valve chamber 376. A passage 378 extends from the apply side of the intermediate servo to the chamber 376 and is connected thereto adjacent land 372. Passage 190 communicates directly with the lower end of the valve element 368. A valve spring 380 acts on the element 368 to urge it normally in an upward direction. Governor pressure passage 232, which communicates with the upper end of each of the shift valve chambers, communicates also with the upper end of the valve chamber 376. This allows a governor pressure force to act upon the land 370 to oppose the force of valve spring 380.

Throttle pressure from passage 246 is distributed to the valve chamber 376 through a throttle pressure passage 382. A cutback control valve 384 provides a connection between passage 382 and passage 246. Passage 382 intersects chamber 376 at a location adjacent land 370.

A coasting boost valve output pressure passage 386 intersects the chamber 376 at a location intermediate lands 370 and 372. Passage 386 communicates directly with passage 146.

Control pressure will be fed to the coasting boost valve whenever the intermediate servo is applied. Thus it is possible to achieve a line pressure boost whenever the vehicle is coasting in the intermediate speed ratio. It is at this time that an increase in the capacities of the intermediate speed servo and the forward clutch is required. If the vehicle is coasting in the intermediate speed ratio at relative low speed, however, the coasting boost valve is ineffective to provide a line pressure boost.

When the manual valve assumes the D position, passage 190 is pressurized. This causes the lower end of the valve element 368 to become pressurized thus locking the coasting boost valve in the position shown. This interrupts its normal regulating action.

The coasting boost valve is capable of regulating the pressure in passage 378 to produce a resultant pressure in passage 386 that is related in magnitude to vehicle speed. This pressure in passage 386 acts upon the area defined by differential diameter valve lands 138 and 140 of the pressure booster valve element 134. When the valve 366 is not regulating, throttle pressure passes directly from passage 382 to passage 386. This produces a throttle pressure force that supplements the throttle pressure force acting on the lower end of land 140. Throttle pressure in passage 382 is obtained from the cutback valve 384 when it assumes the position shown. At other times, however, the cutback valve is effective to exhaust passage 382 through exhaust port 388. Thus passage 382 functions as an exhaust passage which will permit valve 366 to regulate the pressure in passage 378.

The cutback valve includes a valve spool 390 which has formed thereon a pair of valve lands 392 and 394. Located between these lands is a third land of lesser diameter, as shown at 396. Valve element 390 is slidably situated within the valve chamber 398. A passage 246 communicates with chamber 390 adjacent land 396. Throttle pressure is distributed through passage 246 to the area defined by differential diameter lands 396 and 392. The resulting force opposes the force of the governor pressure acting on the upper end of land 392. Governor pressure is supplied to the chamber 398 through passage 232.

During initial acceleration from a standing start, the hydrokinetic torque converter functions to multiply engine torque. Thus the torque that must be accommodated by the clutch and brake servos is relatively high. It is at this time that the cutback control valve is effective to distribute primary throttle pressure to passage 146 thereby augmenting the throttle pressure force acting on land 140. As the vehicle accelerates, the governor pressure shifts valve element 390 in a downward direction thereby exhausting passage 382. This occurs at a time prior to or simultaneously with a 1–2 upshift.

It is apparent from the foregoing description that the transmission system is capable of being conditioned for operation in any one of three driving ranges. In driving range D, the transmission system operates automatically to produce ratio changes that depend upon the operating requirements. The automatic ratio shifting tendencies can be overruled, however, when the manual valve is shifted to the D2 position. The same is true if it is shifted to the L position. The transmission system in these instances becomes locked in either the intermediate ratio or the low speed ratio and neither upshifts nor downshifts can be obtained. The only exception to this occurs when the manual valve is shifted to the L position when the vehicle is traveling at a speed greater than a safe value. In this instance, the transmission system will initially assume an intermediate speed ratio condition until the vehicle falls below that predetermined safe value. Thereafter the transmission system will be conditioned for continuous operation in the low speed ratio.

Having thus described a preferred form of my invention, what I claim and desire to secure by U.S. Letters Patent is:

1. A power transmission mechanism for delivering driving torque from a driving member to a driven member comprising geared torque delivery paths between said driving member and said driven member, fluid pressure operated servo means for controlling the relative motion of rotary elements of said torque delivery paths, a source of a control pressure, conduit structure interconnecting said pressure source and said servo means, a first distributor valve means in said conduit structure for controlling pressure distribution from said source to a first and a second of said servo means thereby conditioning the latter for speed ratio changes between a low speed ratio and an intermediate speed ratio, a second distributor valve means in said conduit structure for controlling pressure distribution to said second and a third of said servo means thereby conditioning the latter for speed ratio changes between an intermediate speed ratio and a high speed ratio, a source of a first torque sensitive pressure signal, a source of a second driven speed sensitive pressure signal, signal passages connecting each distributor valve means with each of said signal sources whereby automatic ratio controlling tendencies are imparted to the distributor valve means, a manually operated valve means in said conduit structure for controlling distribution of pressure from aid source to each of said distributor valve means and having three forward drive range positions, said manually operated valve means defining in part of a fluid connection between said control pressure source and each of said distributor valve means when it assumes a first position thereby conditioning each distributor valve means for automatic ratio changes, said manual valve means being adapted to overrule the automatic upshifting and downshifting tendencies of each distributor valve means when it assumes a second position whereby said first distributor valve means is caused to establish an intermediate speed ratio condition continuously, said manual valve means forming in part a control pressure flow path from said source to said first servo means through said first distributor valve means when it assumes a third position thereby conditioning said valve system for continuous low speed ratio operation.

2. A power transmission mechanism comprising geared torque delivery paths between a driving member and a driven member, fluid pressure operated servo means for controlling relative motion of rotary elements of said paths, a control pressure source, conduit structure interconnecting said source and said servo means, a first fluid pressure distributor valve means located in said conduit structure and partly defining the same for controlling pressure distribution to a first and a second of said servo means thereby initiating speed ratio changes between the low speed ratio and the intermediate speed ratio, second fluid pressure distributor valve means disposed in and defining in part said conduit structure for controlling distribution of pressure to said second and a third of said servo means for conditioning the latter for speed ratio changes between an intermediate speed ratio and a high speed ratio, manual valve means in said conduit structure for controlling distribution of pressure to each distributor valve means, said manual valve means having three operating positions, a source of a first pressure signal that is proportional in magnitude to the speed of said driven member, a source of a second pressure signal that is proportional in magnitude to the torque applied to said driving member, each pressure signal acting upon each of said distributor valve means for controlling automatic ratio changes, and an auxiliary passage interconnecting said manual valve and said first distributor valve means, said manual valve means defining in part a fluid connection between said control pressure source and each of said distributor valve means when it assumes a first operating position thereby conditioning said mechanism for automatic speed ratio changes in response to changes in magnitudes of said pressure signtals, said manual valve means upon assuming a second position forming in part a control pressure flow path to said auxiliary passage whereby said first distributor valve means is hydraulically locked in an intermediate speed ratio position and said mechanism is conditioned for continuous operation in the intermediate speed ratio.

3. The combination as set forth in claim 1 wherein said manual valve means is adapted to interrupt distribution of pressure to said second distributor valve means when it assumes said second position whereby automatic upshifting tendencies and downshifting tendencies between the intermediate speed ratio and the high speed ratio are overruled.

4. The combination as set forth in claim 2 wherein said manual valve means is adapted to interrupt distribution of pressure to said second distributor valve means when it assumes said second position whereby automatic upshifting tendencies and downshifting tendencies between the intermediate speed ratio and the high speed ratio are overruled.

5. The combination as set forth in claim 1 wherein said manual valve means is adapted to interrupt distribution of pressure to said second distributor valve means when it assumes said second position whereby automatic upshifting tendencies and downshifting tendencies between the intermediate speed ratio and the high speed ratio are overruled, said first distributor valve means comprising two separate valve parts, the first of said valve parts engaging the second of said valve parts and having formed thereon separate valve areas that are in fluid communication respectively with said first pressure signal and said second pressure signal, said second valve part having formed thereon pressure distributing valve lands, an auxiliary passage extending from said manual valve means to said first distributor valve means at a location intermediate said valve parts whereby said valve lands are urged to an intermediate speed ratio position when said auxiliary passage means is pressurized upon movement of said manual valve means to said second position.

6. The combination as set forth in claim 2 wherein said manual valve means is adapted to interrupt distribution of pressure to said second distributor valve means when it assumes said second position whereby automatic upshifting tendencies and downshifting tendencies between the intermediate speed ratio and the high speed ratio are overruled, said first distributor valve means comprising two separate valve parts, the first of said valve parts engaging the second of said valve parts and having formed thereon separate valve areas that are in fluid communication respectively with said first pressure signal and said second pressure signal, said second valve part having formed thereon pressure distributing valve lands, said auxiliary passage extending from said manual valve means to said first distributor valve means at a location intermediate said valve parts whereby said valve lands are urged to an intermediate speed ratio position when said auxiliary passage means is pressurized upon movement of said manual valve means to said second position.

7. The combination as set forth in claim 1 wherein said manual valve means is adapted to interrupt distribution of pressure to said second distributor valve means when it assumes said second position whereby automatic upshifting tendencies and downshifting tendencies between the intermediate speed ratio and the high speed ratio are overruled, said servo means including a low speed ratio reaction brake and said conduit structure including a bypass passage extending from said manual valve means to said reaction brake through said first distributor valve means when said manual valve means assumes a third operating position and said first distributor valve means is in a low speed ratio position, said conduit structure including a passage portion extending from one part of said first distributor valve means to said manual valve means, said passage portion being pressurized upon movement of said manual valve means to said third operation position.

8. The combination as set forth in claim 2 wherein said manual valve means is adapted to interrupt distribution of pressure to said second distributor valve means when it assumes said second position whereby automatic upshifting tendencies and downshifting tendencies between the intermediate speed ratio and the high speed ratio are overruled, said servo means including a low speed ratio reaction brake and said conduit structure including a bypass passage extending from said manual valve means to said reaction brake through said first distributor valve means when said manual valve means assumes a third operating position and said first distributor valve means is in a low speed ratio position, said conduit structure including a passage portion extending from one part of said first distributor valve means to said manual valve means, said passage portion being pressurized upon movement of said manual valve means to said third operation position.

9. The combination as set forth in claim 2 wherein said manual valve means is adapted to interrupt distribution of pressure to said second distributor valve means when it assumes said second operating position whereby automatic upshifting tendencies and downshifting tendencies between the intermediate speed ratio and the high speed ratio are overruled, said first distributor valve means comprising two separate valve parts, the first of said valve parts engaging the second of said valve parts and having formed thereon separate valve areas that are in fluid communication respectively with said first pressure signal source and said second pressure signal source, said second valve part having formed thereon pressure distributing valve lands, said auxiliary passage extending from said manual valve means to said first distributor valve means at a location intermediate said valve parts whereby said valve lands are urged to an intermediate speed ratio position when said auxiliary passage means is pressurized upon movement of said manual valve means to said second position, said servo means including a low speed ratio reaction brake and said conduit structure including a bypass passage extending from said manual valve means to said reaction brake through said first distributor valve means when said manual valve means assumes a third operating position and said first distributor valve means when said manual valve means assumes a third operating position and said first distributor valve means is in a low speed ratio position.

10. A power transmission mechanism for delivering driving torque from a driving member to a driven member comprising geared torque delivery paths between said driving member and said driven member, fluid pressure operated servo means for controlling the relative motion of rotary elements of said torque delivery paths, a fluid pressure source, conduit structure interconnecting said pressure source and said servo means, a first distributor valve in said conduit structure for controlling pressure distribution from said source to said servo means thereby conditioning the latter for speed ratio changes between a low speed ratio and an intermediate speed ratio, a second distributor valve means in said conduit structure for controlling pressure distribution to said servo means thereby conditioning the latter for speed ratio changes between an intermediate speed ratio and a high speed ratio, a source of a first torque sensitive pressure signal, a source of a second driven speed sensitive pressure signal, signal passages connecting each distributor valve means with each of said signal sources whereby automatic ratio controlling tendencies are imparted to the distributor valve means personally operated manual valve means in said conduit structure for controlling distribution of pressure from said source to each of said distributor valve means, said manual valve means having three forward drive range positions, said manual valve means being adapted to distribute pressure from said source to each of said distributor valve means when it assumes a first position thereby conditioning each distributor valve means for automatic ratio changes, said manual valve means being adapted to overrule the automatic upshifting and downshifting tendencies of said first distributor valve means when it assumes a second position whereby said distributor valve means are caused to assume an intermediate speed ratio condition continuously, said manual valve means being adapted to distribute pressure from said source to said servo means through said first distributor valve means when it assumes a third operating position thereby conditioning said valve system for continuous low speed ratio operation, said manual valve means being adapted to interrupt distribution of pressure to said second distributor valve means when it assumes said second operating position whereby automatic upshifting tendencies and downshifting tendencies between the intermediate speed ratio and the high speed ratio are overruled, said servo means including a low speed ratio reaction brake and said conduit structure including a bypass passage extending from said manual valve means to said reaction brake through said first distributor valve means when said manual valve means assumes a third operating position and said distributor valve means is in a low speed ratio position, said conduit means including a passage portion extending to said first distributor valve means from said manual valve means, said passage portion being pressurized upon movement of said manual valve means to said third operating position, a 2–1 scheduling valve situated in and partly defining said passage portion, said scheduling valve including an exhaust port and lands of differential area whereby it is adapted to regulate the pressure distributed to said first distributor valve means through said passage portion when said first distributor valve means assumes an intermediate speed ratio position, and a feedback passage interconnecting said first distributor valve means and said scheduling valve which is pressurized upon movement of said first distributor valve means to a low speed ratio position thereby overruling the influences of said scheduling valve.

11. The combination as set forth in claim 2 wherein said manual valve means being adapted to interrupt distribution of pressure to said second distributor valve means when it assumes said second operating position whereby automatic upshifting tendencies and downshifting tendencies between the intermediate speed ratio and the high speed ratio are overruled, said servo means including a low speed ratio reaction brake and said conduit structure including a bypass passage extending from said manual valve means to said reaction brake through said first distributor valve means when said manual valve means assumes a third operating position and said distributor valve means is in a low speed ratio position, said conduit means including a passage portion extending to said first distributor valve means from said manual valve means, said passage portion being pressurized upon movement of said manual valve means to said third operating position, a 2–1 scheduling valve situated in and partly defining said passage portion, said scheduling valve including an exhaust port and the lands of differential area whereby it is adapted to regulate the pressure distributed to said first distributor valve means through said passage portion when said first distributor valve means assumes an intermediate speed ratio position and the feedback passage interconnecting said first distributor valve means and said scheduling valve which is pressurized upon movement of said first distributor valve means to a low speed ratio position thereby overruling the influence of said scheduling valve.

12. The combination as set forth in claim 11 wherein said exhaust port in said scheduling valve and said feedback passage forming a common exhaust flow path when said scheduling valve assumes a regulating condition.

13. The combination as set forth in claim 2 wherein said manual valve means is adapted to interrupt distribution of pressure to said second distributor valve means when it assumes said second position whereby automatic upshifting tendencies and downshifting tendencies between the intermediate speed ratio and the high speed ratio are overruled, said first distributor valve means comprising two separate valve parts, the first of said valve parts engaging the second of said valve parts and having formed thereon separate valve areas that are in fluid communication respectively with said first pressure signal and said second pressure signal, said second valve part having formed thereon pressure distributing valve lands, said auxiliary passage extending from said manual valve means and extending to said first distributor valve means at a location intermediate said valve parts whereby said valve lands are urged to an intermediate speed ratio position when said auxiliary passage means is pressurized upon movement of said manual valve means to said second operating position, said servo means including a low speed ratio reaction brake and said conduit structure including a bypass passage extending from said manual valve means to said reaction brake through said first distributor valve means when said manual valve means assumes a third operating position and said distributor valve means is in a low speed ratio position, said conduit means including a passage portion extending from one part thereof to said manual valve means, said passage portion being pressurized upon movement of said manual valve means to said third operating position, and a 2–1 scheduling valve situated in and partly defining said conduit portion, said scheduling valve including an exhaust port and lands of differential area whereby it is adapted to regulate the pressure distributed to said first distributor valve means through said conduit portion when said first distributor valve means assumes an intermediate speed ratio position, and a feedback passage interconnecting said first distributor valve means and said scheduling valve which is pressurized upon movement of said first distributor valve to a low speed ratio position thereby overruling the influence of said scheduling valve.

14. The combination as set forth in claim 13 wherein said exhaust port in said scheduling valve and said feedback passage forming a common exhaust flow path when said scheduling valve assumes a regulating condition.

15. The combination as set forth in claim 10 wherein said exhaust port in said scheduling valve and said feedback passage forming a common exhaust flow path when said scheduling valve assumes a regulating condition.

References Cited
UNITED STATES PATENTS

| | | | |
|---|---|---|---|
| 2,932,990 | 4/1960 | Cartwright et al. | 74—763 |
| 3,000,230 | 9/1961 | Froslie | 74—472 |
| 3,004,446 | 10/1961 | Flinn | 74—472 |
| 3,053,116 | 9/1962 | Christenson et al. | 74—752 |
| 3,313,183 | 4/1967 | Bailey et al. | 74—752 |

FRED C. MATTERN, Jr., *Primary Examiner.*

THOMAS C. PERRY, *Assistant Examiner.*